UNITED STATES PATENT OFFICE 2,457,660

N-TERTIARY ALKYL AMIDES AND METHOD FOR PREPARING SAME

William F. Gresham, Lindamere, and William E. Grigsby, Wilmington, Del., assignors to E. I. du Pont de Nemours & Company, Wilmington, Del., a corporation of Delaware No Drawing. Application June 1, 1944, Serial No. 538,342

12 Claims. (Cl. 260—561)

This invention relates to N-tertiary alkyl organic acid amides and particularly to amides containing a tertiary carbon atom attached to an amido nitrogen. The invention also relates to a novel procedure for the preparation of these organic acid amides.

Certain N-tertiary alkyl amides have been prepared heretofore. For example, N-tertiary butyl acetamide has been prepared by treating pinacoline oxime with PCl5 in ether solution (Scholl, Liebig's Ann. 338, 16 (1905)). In general, the methods which have been employed heretofore for the preparation of N-tertiary alkyl amides have been unattractive from an economic standpoint, and for this reason, among others, it is believed that these compounds have not been available in the past in commercial quantity.

An object of this invention is to provide a simple and economically attractive process for preparing organic acid amides containing a tertiary carbon atom attached to the amido nitrogen. Another object is to provide novel and useful N-tertiary alkyl amides which have not been obtainable by the previously known methods for preparing N-tertiary alkyl amides.

These and other objects of the invention are accomplished by heating a nitrile with a tertiary alcohol or tertiary olefin, or an organic ester of a tertiary alcohol. In a specific embodiment the invention contemplates treating a nitrile with a tertiary olefin and water in the presence of an acidic catalyst to obtain a N-tertiary alkyl amide. This is illustrated by specific reactants in the following equation.

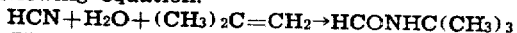

$HCN + H_2O + (CH_3)_2C=CH_2 \rightarrow HCONHC(CH_3)_3$

The nitriles which may be employed in the practice of this invention include hydrogen cyanide, aliphatic nitriles such as acetonitrile, propionitrile, isobutyronitrile, pivalonitrile, acrylonitrile, methacrylonitrile, aminoacetonitrile, formaldehyde cyanhydrin, cyclohexanone cyanhydrin, trimethylene cyanhydrin, succinonitrile, adiponitrile, and the like. The tertiary alcohols and tertiary olefins include tertiary butanol, tertiary amyl alcohol, triethyl carbinol, 3-methyl-1,3-butandiol, and also olefines which give rise to tertiary alkanols on reaction with water, such as isobutylene, trimethylene, isoprene, 2,3-dimethyl butadiene, alpha methyl styrene, 1-methyl cyclohexene and the like. The reaction between the nitrile and the tertiary alcohol or tertiary olefin is preferably conducted in the presence of an acid-reacting catalyst, such as sulfuric acid, hydrochloric acid, phosphoric acid, boron fluoride hydrate, ammonium bisulfate and similar acidic materials. However, the reaction takes place to some extent in the absence of added catalyst. The concentration of the acid-reacting catalyst may be about 1 to 20%, preferably 5 to 10% of the weight of water employed.

In the practice of this invention it is generally preferable to heat the tertiary alcohol, or aqueous tertiary olefin, with the nitrile in the presence of the acidic catalyst, suitably in an autoclave under an autogenous pressure within the range of from atmospheric to about 1000 pounds per square inch. Higher pressures may be employed but these are generally unnecessary. The reaction takes place at a temperature of about 50° to 250° C., preferably about 90° to 175° C. Upon completion of the reaction, the resultant amide may be removed from the reaction mixture by any convenient method such as distillation, crystallization, extraction or the like.

The invention is further illustrated by means of the following examples in which parts are by weight except as otherwise stated.

*Example 1.*—A mixture containing 46.2 parts of formaldehyde cyanhydrin, 25.2 parts of water, 1.8 parts of sulfuric acid and 80 parts isobutylene was heated in a pressure-resistant autoclave at a temperature of 90° to 94° C. under pressure of 300 to 400 pounds per square inch for 2 hours. The reaction mixture was thereafter withdrawn from the autoclave and cooled to room temperature. A small amount of black tarry precipitate was removed by filtration, and the filtrate was transferred to an efficient still. Distillation of the mixture gave a fraction (35.2 parts) which boiled at 100° C., under a pressure of about one millimeter. This material crystallized upon cooling. Upon recrystallization from benzene this material gave pure N-tertiary butyl hydroxy acetamide, M. P. 77° to 78.5° C.

*Example 2.*—A mixture containing 148 parts of tertiary butanol, 54 parts of hydrogen cyanide and 4 parts of sulfuric acid was heated at a temperature of 135° under autogenous pressure for 4 hours in an autoclave which was equipped with a rupture disk capable of withstanding a pressure of 100 atmospheres. The resultant mixture was withdrawn from the autoclave, and was transferred to a still for recovery of isobutylene, hydrogen cyanide, and tertiary butanol. The distillation was then continued at diminished pressure, (9 millimeters) yielding 15.1 parts of a water soluble liquid distillate (13.3, 13.4% N) at 79° to 83° C., followed by 3.8 parts of similar material (14.1% N), which distilled at about the same temperature and pressure.

This corresponds to 10% conversion of tertiary butanol to N-tertiary butyl formamide (% N, calc. for HCONHC₄H₉, 13.86%).

Example 3.—A mixture containing 84 parts of isobutylene, 4 parts of sulfuric acid, 26.9 parts of water and 54 parts of adiponitrile was heated in an autoclave under autogenous pressure (300 to 380 pounds per square inch) at a temperature of 90° to 115° for 2 hours. The resultant product was distilled yielding tertiary butanol and 69.2 parts of a semi-solid residue. This residue, on filtration, gave 17.5 parts of a moist crystalline solid, which on recrystallization from ethyl acetate gave di(N-tertiary butyl) adipamide, M. P. 208° C. Analysis: Found 11.5, 11.8% N; calc. for ((CH₃)₃CNHCO(CH₂)₂)₂, 10.94% N.

Example 4.—A mixture containing 38.3 parts of acetonitrile, 78 parts of isobutylene, 27.2 parts of water and 2 parts of sulfuric acid was heated for 2 hours at a temperature of 90° to 110° C. under a pressure of 175 to 460 pounds per square inch. The resultant product was a colorless liquid which, after standing overnight, contained a small amount of crystalline material. The product was distilled at diminished pressure, and distillate was collected until a temperature of 44° at 95 millimeters was reached. The distilling flask then contained a residue, which, on crystallization from benzene, yielded 3 parts of N-tertiary butyl acetamide, M. P. 98° C.

Example 5.—A mixture containing 88.5 parts of tertiary amyl alcohol, 40.9 parts of acetonitrile, 18.4 parts of water and 2 parts of sulfuric acid was heated at a temperature of 130° to 140° C. for 2 hours under pressure of 150 to 225 pounds per square inch. The resultant product, which was a colorless liquid, was transferred to a still and the volatile constituents were removed up to a temperature of 52° C. at 108 millimeters. The solid residue was recrystallized from benzene, yielding N-tertiary amyl acetamide, M. P., 77° to 78° C. Analysis: Found 10.1% N; cal. for CH₃CONHC₅H₁₁, 10.85% N.

Example 6.—A mixture containing 148 parts of tertiary butyl alcohol and 54 parts of commercial hydrogen cyanide was heated in the absence of an added catalyst for 4 hours at 135° C. under autogenous pressure in an autoclave which was equipped with a rupture disk capable of withstanding a pressure of 100 atmospheres. Distillation of the resultant product gave 3.3 parts of N-tertiary butyl formamide, B. P., 89° at 14 millimeters pressure.

These examples are intended to be illustrative only, since various modifications in the general method herein disclosed will occur to those skilled in the art. For example, the N-tertiary alkyl amide need not necessarily be removed from the reaction mixture as such, but acid hydrolysis thereof may be allowed to proceed until the amide is converted partially or completely to the corresponding carboxylic acid. Alternatively, the reaction products herein described may be heated in the presence of aqueous alkali, whereby conversion to the corresponding amine takes place. When this is done, the tertiary alkyl amine can generally be distilled directly from the reaction mixture.

The reaction between the nitrile and tertiary alcohol or olefine may be conducted either batchwise or continuously. Any suitable apparatus, such as an autoclave made of or lined with corrosion resistant materials such as glass, enamel, lead, copper, silver, nickel, stainless steel, and the like, may be employed.

The herein described organic acid amides containing a tertiary carbon atom attached to the amido group are useful as solvents, plasticizers, glycerine substitutes, resin intermediates, and agents for selectively absorbing acetylene from hydrocarbon gases.

It will be understood that many widely different embodiments of the present invention may be made without departing from the spirit and scope thereof and accordingly we do not limit ourselves except as set forth in the appended claims.

We claim:

1. A process for the synthesis of organic acid amides having a tertiary carbon atom attached to an amido nitrogen which comprises subjecting a nitrile to reaction with a tertiary olefin in an aqueous medium, containing about 1% to 20%, based upon the weight of water present, of an acid-reacting catalyst, whereby a reaction mixture containing an organic acid amide having a tertiary carbon atom attached to the amido nitrogen is obtained, and thereafter separating the said organic acid amide from the said reaction mixture.

2. A process for the synthesis of an N-tertiary butyl amide which comprises subjecting a nitrile to reaction with isobutylene in an aqueous acid medium at a temperature in the range of about 50° to 250° C., and at a pressure in the range of from atmospheric pressure to about 1000 pounds per square inch and separating an N-tertiary butyl amide from the resulting reaction mixture.

3. A process for the synthesis of N-tertiary butyl formamide which comprises reacting hydrogen cyanide with isobutylene in an aqueous acid medium at a temperature in the range of about 50° to 250° C., and at a pressure in the range of from atmospheric pressure to about 1000 pounds per square inch and separating the said N-tertiary butyl formamide having the formula HCONHC(CH₃)₃ from the reaction mixture.

4. N-tertiary butyl hydroxyacetamide.

5. A process for the synthesis of N-tertiary butyl hydroxyacetamide which comprises reacting formaldehyde cyanhydrin with isobutylene in an aqueous acid medium at a temperature within the range of about 50° to 250° C. under a pressure within the range of from atmospheric pressure to about 1,000 pounds per square inch, and separating N-tertiary butyl hydroxyacetamide from the reaction mixture.

6. A process for the synthesis of di-(N-tertiary butyl) adipamide which comprises reacting adiponitrile with isobutylene in an aqueous acid medium at a temperature within the range of about 50° to 250° C., and at a pressure in the range of from atmospreric pressure to about 1,000 pounds per square inch, and separating di-(N-tertiary butyl) adipamide from the resulting reaction mixture.

7. A process for the synthesis of N-tertiary alkyl amides which comprises reacting a nitrile with a tertiary monoolefine at a temperature of about 90° to 175° C. in the presence of an acid-reacting catalyst, having a concentration in water of from 1 to 20% by weight, and thereafter separating from the resulting reaction mixture the N-tertiary alkyl amide produced by the said reaction.

8. A process for the synthesis of organic acid amides having a tertiary carbon atom attached to an amido nitrogen which comprises subjecting a nitrile to reaction with a tertiary olefine in an aqueous acid medium containing about 1% to 20% by weight, based on the weight of water present, of sulfuric acid, whereby a reaction mixture containing an organic acid amide having a tertiary carbon atom attached to the amido nitrogen is obtained, and thereafter separating the said organic acid amide from the said reaction mixture.

9. A process for the synthesis of an N-tertiary alkyl formamide which comprises subjecting hydrogen cyanide to reaction with a tertiary olefine hydrocarbon in an aqueous acid medium, whereby a reaction mixture containing N-tertiary alkyl formamide is obtained, and thereafter separating the said organic acid amide from the said reaction mixture.

10. A process for the synthesis of an N-tertiary alkyl amide which comprises subjecting a nitrile to reaction with a tertiary monoolefine hydrocarbon in the presence of an aqueous acidic catalyst at a temperature in the range of about 50° to 250° C., whereby a reaction mixture containing an N-tertiary alkyl amide is obtained, and thereafter separating the said N-tertiary alkyl amide from the said reaction mixture.

11. A process for the synthesis of an amide having a tertiary carbon atom attached to an amide nitrogen which comprises subjecting a cyanoalkane to reaction in an acid medium with water and a tertiary olefine hydrocarbon, and at a pressure in the range of from atmospheric pressure to about 1000 lbs. per square inch, and separating an amide having a tertiary carbon atom attached to amido nitrogen from the resulting reaction mixture.

12. A process for the synthesis of an amide having a tertiary carbon atom attached to an amido nitrogen which comprises subjecting a cyanoalkane to reaction in an acid medium with water and a tertiary olefine hydrocarbon, under superatmospheric pressure, and separating an amide having a tertiary carbon atom attached to amido nitrogen from the resulting reaction mixture.

WILLIAM F. GRESHAM.
WILLIAM E. GRIGSBY.

REFERENCES CITED

The following references are of record in the file of this patent:

UNITED STATES PATENTS

| Number | Name | Date |
|---|---|---|
| 2,262,002 | Hopff et al. | Nov. 11, 1941 |
| 2,320,089 | Lichty | May 25, 1943 |

FOREIGN PATENTS

| Number | Country | Date |
|---|---|---|
| 394,084 | Great Britain | June 17, 1933 |

OTHER REFERENCES

Schmidt, "Ber. Deut. Chem. Ges.," vol. 36 (1904), page 2475.

Scholl, "Annalen der Chemie," vol. 338 (1905), page 16.

Schmidt, "Zertschrift fur Physikalische Chemie," vol. 58 (1907), page 514.

Brander, "Rec. Trav. Chim. Pays. Bas.," vol. 37 (1918), page 79.

Sidgwick, "Organic Chemistry of Nitrogen," Taylor and Baker, 1937, pages 304–417, 320, 321, and 322.